(12) United States Patent
Prabhu et al.

(10) Patent No.: US 8,964,239 B2
(45) Date of Patent: Feb. 24, 2015

(54) METHODS AND SYSTEMS FOR HANDLING MULTIPLE DOCUMENTS WHILE SCANNING

(71) Applicant: Xerox Corporation, Norwalk, CT (US)

(72) Inventors: Girish Prabhu, Bangalore, IN (US); Rinku Gajera, Kamataka (IN); Atul K Saraf, Bangalore (IN); Kovendhan Ponnavaikko, Tamil Nadu (IN); Nischal M Piratla, Hyderabad (IN)

(73) Assignee: Xerox Corporation, Norwalk, CT (US)

( * ) Notice: Subject to any disclaimer, the term of this patent is extended or adjusted under 35 U.S.C. 154(b) by 136 days.

(21) Appl. No.: 13/742,431

(22) Filed: Jan. 16, 2013

(65) Prior Publication Data
US 2014/0198350 A1    Jul. 17, 2014

(51) Int. Cl.
| | | |
|---|---|---|
| *G06K 15/00* | (2006.01) | |
| *H04N 1/40* | (2006.01) | |
| *H04N 1/46* | (2006.01) | |
| *G06K 9/62* | (2006.01) | |
| *H04N 1/21* | (2006.01) | |
| *H04N 1/00* | (2006.01) | |
| *H04N 1/203* | (2006.01) | |
| *H04N 1/32* | (2006.01) | |
| *H04N 1/10* | (2006.01) | |

(52) U.S. Cl.
CPC ...... *H04N 1/2166* (2013.01); *H04N 2201/3243* (2013.01); *H04N 1/00708* (2013.01); *H04N 1/10* (2013.01); *H04N 1/2038* (2013.01); *H04N 1/32101* (2013.01); *H04N 2201/0422* (2013.01); *H04N 2201/33321* (2013.01); *H04N 2201/3274* (2013.01)

USPC .......... 358/1.18; 358/448; 358/540; 382/209; 382/156; 382/159

(58) Field of Classification Search
None
See application file for complete search history.

(56) References Cited

U.S. PATENT DOCUMENTS

| | | | | |
|---|---|---|---|---|
| 3,033,449 | A * | 5/1962 | James et al. ................... | 235/439 |
| 4,153,931 | A * | 5/1979 | Green et al. .................... | 705/28 |
| 4,790,475 | A * | 12/1988 | Griffin ........................... | 229/69 |
| 5,392,447 | A * | 2/1995 | Schlack et al. ................ | 715/863 |
| 5,745,248 | A | 4/1998 | Nickerson | |
| 5,767,989 | A * | 6/1998 | Sakaguchi .................... | 358/474 |
| 5,859,956 | A * | 1/1999 | Sugiyama et al. ........... | 358/1.13 |
| 5,978,772 | A * | 11/1999 | Mold .............................. | 705/16 |
| 6,014,454 | A * | 1/2000 | Kunkler ........................ | 382/137 |
| 6,282,826 | B1 * | 9/2001 | Richards .................... | 40/654.01 |
| 6,738,154 | B1 * | 5/2004 | Venable ....................... | 358/1.15 |
| 6,795,209 | B1 | 9/2004 | Patton et al. | |
| 6,913,188 | B2 * | 7/2005 | Wong et al. .................. | 229/67.1 |
| 8,059,858 | B2 * | 11/2011 | Brundage et al. ............. | 382/100 |
| 8,194,283 | B2 * | 6/2012 | Honeck et al. ................ | 358/1.9 |
| 8,446,652 | B2 * | 5/2013 | Curtis .......................... | 358/505 |
| 8,817,316 | B2 * | 8/2014 | Yoshida ....................... | 358/1.18 |

(Continued)

*Primary Examiner* — Madelein Nguyen (57) ABSTRACT

An embodiment discloses a method utilizing a device for handling multiple documents during scanning. The method includes receiving multiple documents on or within a sleeve to enable scanning of at least one of a first side and a second side of each of the documents in a single scanning operation. The method includes identifying one or more dimensional characteristics of the sleeve and each document arranged on or within the sleeve. The method further includes scanning at least one of the first side and the second side of each document. Moreover, the method includes tagging the scanned documents based on at least one of content characteristics and the dimensional characteristics of the documents.

29 Claims, 8 Drawing Sheets

(56) References Cited

U.S. PATENT DOCUMENTS

| | | | |
|---|---|---|---|
| 2001/0007188 A1* | 7/2001 | Taniguchi | 53/460 |
| 2001/0012095 A1* | 8/2001 | Mui et al. | 355/40 |
| 2002/0111960 A1* | 8/2002 | Irons et al. | 707/204 |
| 2002/0141660 A1* | 10/2002 | Bellavita et al. | 382/309 |
| 2002/0145035 A1* | 10/2002 | Jones | 235/379 |
| 2002/0150311 A1* | 10/2002 | Lynn | 382/306 |
| 2003/0043041 A1* | 3/2003 | Zeps et al. | 340/573.1 |
| 2004/0063106 A1* | 4/2004 | Dorsel | 435/6 |
| 2004/0215597 A1* | 10/2004 | Fitzgerald et al. | 707/1 |
| 2005/0040642 A1* | 2/2005 | Jiang | 283/81 |
| 2005/0174591 A1* | 8/2005 | Sowinski et al. | 358/1.9 |
| 2006/0026102 A1* | 2/2006 | Ryan | 705/50 |
| 2007/0019221 A1* | 1/2007 | Jurkowski et al. | 358/1.13 |
| 2007/0097451 A1* | 5/2007 | Marappan | 358/453 |
| 2007/0098244 A1* | 5/2007 | Franklin et al. | 382/139 |
| 2007/0127805 A1* | 6/2007 | Foth et al. | 382/137 |
| 2008/0174676 A1* | 7/2008 | Squilla et al. | 348/231.6 |
| 2009/0003721 A1* | 1/2009 | Karidi | 382/254 |
| 2009/0034881 A1* | 2/2009 | Lapstun et al. | 382/321 |
| 2010/0079781 A1* | 4/2010 | Yamamoto | 358/1.13 |
| 2010/0165393 A1* | 7/2010 | Nakayama | 358/1.15 |
| 2010/0226559 A1* | 9/2010 | Najari et al. | 382/140 |
| 2010/0299621 A1* | 11/2010 | Piehler et al. | 715/764 |
| 2010/0312609 A1* | 12/2010 | Epshtein et al. | 705/10 |
| 2010/0322520 A1* | 12/2010 | Yoshida | 382/195 |
| 2011/0073659 A1* | 3/2011 | Lawyer et al. | 235/488 |
| 2011/0175804 A1* | 7/2011 | Grover | 345/156 |
| 2012/0030118 A1* | 2/2012 | Huff et al. | 705/45 |
| 2012/0075442 A1* | 3/2012 | Vujic | 348/61 |
| 2012/0105875 A1* | 5/2012 | Chinnici et al. | 358/1.9 |
| 2012/0150745 A1* | 6/2012 | Csulits et al. | 705/45 |
| 2013/0146658 A1* | 6/2013 | Guerra | 235/380 |
| 2013/0148874 A1* | 6/2013 | Jones et al. | 382/135 |

* cited by examiner

METHODS AND SYSTEMS FOR HANDLING MULTIPLE DOCUMENTS WHILE SCANNING

CROSS-REFERENCE TO RELATED APPLICATION(S)

The present application includes subject matter that is related to the disclosure contained in U.S. patent application Ser. No. 13/359,510, filed on Jan. 27, 2012, now US Publication No. 2013-0198072, which is incorporated herein in its entirety by reference.

TECHNICAL FIELD

The presently disclosed embodiments relate to various business services, more particularly, to methods and systems for handling documents related to those business services.

BACKGROUND

Business services, such as banking, telecom or insurance, play a significant role in the day-to-day life of many individuals. Subscribing to any of the services often requires customers to fill-out one or more application forms, which may vary based on the service. For example, a customer seeking to open a new account with a bank completes an account opening form, while a customer seeking to apply for a loan completes a corresponding loan application form. In the current banking scenarios, a customer fills out an application form in the presence of a branch representative and then the completed application form is transferred to a back-office. In the back-office, the completed forms are processed along with various other forms received from other branches and then stored for later retrieval.

Many business service providers may require supporting documents, such as proof of identity and/or address, while administering services such as opening a bank account, or updating customer details. Examples of proof of identities and/or address include Voter ID, passport, and Social Security Number (SSN) documents. These documents are available in various standard and non-standard sizes, and typically are below A4 or A3 sizes. The customer either scans or copies the required supporting documents to create duplicate documents, which are submitted to the bank branch. In the bank branch, these documents are archived in a physical or virtual location. For example, the documents are stored in back offices or in online databases/storage devices. Before archiving, one or more bank staff employees manually enter the type of each document and provide a digital name for the document. This task requires significant effort and time. Additionally, retrieval of these stored documents for various application processing purposes, such as auditing, may be inefficient.

Moreover, in situations where the customer submits multiple supporting documents, scanning each document one at a time becomes tedious and time consuming. In addition, reversing each document on a platen (scanning surface) for double-sided scanning increases amount of time and costs for processing the documents. The above procedures may, thus, constitute an inefficient use of human effort and energy. Although there are a few systems available in the market which are capable of scanning multiple documents together, those systems are not "intelligent" and cannot identify when two different documents are placed or queued for scanning. For example, if a voter ID and PAN card are placed together for scanning, conventional systems consider both as a single document to be scanned and provide a scanned output accordingly.

It may therefore be advantageous to provide methods and systems for handling documents that address the above described inefficiencies.

SUMMARY

The present disclosure discloses methods and systems for handling multiple documents while scanning. In an embodiment a method utilizing a device for handling multiple documents during scanning is disclosed. The method includes receiving multiple documents on or within a sleeve to enable scanning of at least one of a first side and a second side of each of the documents in a single scanning operation. The method further includes identifying one or more dimensional characteristics of the sleeve and each document arranged on or within the sleeve. The method further includes scanning at least one of the first side and the second side of each document. Moreover, the method includes tagging the scanned documents based on at least one of content characteristics and the dimensional characteristics of the documents.

Other embodiments disclose a system for processing multiple documents while scanning. The system includes a sleeve configured to receive multiple documents in orientations that enable scanning of one of a first side and a second side of each of the documents in a single operation. The system further includes a detection module configured to identify one or more dimensional characteristics of the sleeve and the documents retained by the sleeve. The system furthermore includes a scanning module configured to scan at least one of the first side and the second side of each document. Additionally, the system includes a tagging module configured to tag each document based on at least one of: content characteristics and the dimensional characteristics of the documents.

Additional embodiments describe a method for scanning multiple documents. The method includes receiving a sleeve including multiple documents, each document having a first side and a second side. The method further includes determining at least one dimensional characteristic of the sleeve and at least one of the documents placed inside the sleeve, using pre-defined algorithms. Further, the method includes scanning the first side of each document, detecting flip of the sleeve, and scanning the second side of each document. Moreover, the method includes for each document, associating the first side to a corresponding second side, based on the at least one dimensional characteristic and content characteristics. Additionally, the method includes generating multiple image files, wherein each image file is generated corresponding to a document placed inside the sleeve.

Still other embodiments disclose a method for tagging multiple documents during scanning. The method includes receiving multiple documents, wherein each document has a first side and a second side. After receiving the documents, at least one dimensional characteristic of each document is identified. Then, the first side and the second side of each document are scanned. Thereafter, at least one of hardware and software is used to extract content including at least one of: text data and image data from each document. As a next step, the at least one of hardware and software is used to automatically tag each document based on at least one of: the extracted content, and the at least one dimensional characteristic.

Yet other embodiments disclose a device. The device includes a sleeve configured to receive multiple documents, each document having a first side and a second side. The device includes a platen configured to receive the sleeve having multiple documents. Moreover, the device includes one or more modules configured to detect at least one dimensional characteristic of the documents. The modules are further configured to scan the first side and the second side of each document. Furthermore, the modules are configured to extract content including at least one of text data and image data from each document. Moreover, the modules are configured to generate a scanned output in a pre-defined format. Finally, the modules are configured to tag each scanned document based on at least one of: the extracted content, and the at least one dimensional characteristic.

DETAILED DESCRIPTION

The following detailed description is made with reference to the figures. Exemplary, and in some cases preferred embodiments are described for illustrative purposes only but not to limit its scope, which is defined by the claims. Those of ordinary skill in the art will recognize a number of equivalent variations in the description that follows.

Definitions

Definitions of one or more terms used in the disclosure are provided below. A "processing system" can refer to a system configured to perform various types of operations generally performed in a business center, such as a bank branch, telecom center, postal office, or the like. The "processing system" handles multiple documents, in particular, performs the functions of scanning multiple documents, tagging those documents and the like. Also, the "processing system" can be capable of receiving an input, and may include a display unit for displaying an output. As used herein, a "Multi-Function Device" (MFD) is a single device that offers a number of traditionally separate functionalities, such as printing, copying, scanning, and/or faxing. In the context of the disclosure, the "MFD" is configured to scan multiple documents at a time, tag each document, and/or perform other related activities.

The term "documents" includes all types of documents, such as application forms, supporting documents, checks, or the like. A "sleeve" is a component adapted for receiving multiple documents and arranging those documents on a platen. The "sleeve" is a physical entity, which can be separate from the "MFD" or "processing system", as discussed above.

It is envisioned that the "processing system" or the "MFD" can participate in a network with a number of other devices and entities. A "headquarter" device refers to a device at a higher organizational level than the processing system/MFD; "peer" devices are on the same general organizational level as the processing system; and "support systems" or "back-office" systems can typically perform support and services operations, such as data entry, verifying documents, processing transactions, or the like.

Overview

Embodiments are disclosed for handling multiple documents corresponding to various business services, including, but not limited to, Banking, Telecom, Postal, Government services documentation, Employment documentation, Insurance or the like. The disclosed documents include, but are not limited to, application forms, checks, identification proofs, supporting documents or any other related or otherwise applicable documents. The application forms for each of the business services can vary. For example, application forms relating to opening a new account in the context of banking services may be different from application forms for buying a new connection in the context of telecom services. In many business services, each application form needs to be furnished with a proof of identity, and/or a proof of address, which are often described as supporting documents. Various examples of these supporting documents include, but are not limited to, a PAN card, a Voter ID, a ration card, a passport, a driver's license, and a social security number (SSN) card. Examples of the application forms include application documents for opening a bank account, applying for a loan, applying for a check-book, applying for a postpaid connection, updating customer details, or the like. Each of these documents may be available in various sizes.

In traditional/existing or related systems, if three documents are to be scanned, it may be necessary to utilize the scanning feature six times in order to have each document scanned on both sides. In other words, if a user wishes to scan three documents from both sides, the user scans three documents six times using the existing or related systems/solutions. Exemplary disclosed methods and systems enable the user to scan multiple documents only two times, thereby saving the user's effort, time, and/or energy. Exemplary embodiments, therefore, reduce or even minimize the time and effort required for scanning multiple documents of various sizes. More specifically, the disclosure focuses on scanning multiple documents in a single scan operation. To this end, the disclosure provides a sleeve for arranging multiple documents. The sleeve with the documents is directly placed on a platen, or scanning surface, for scanning, so as to scan front (or first) sides of documents. Thereafter, if necessary or desired, the sleeve is reversed, and is again placed on the platen for scanning back (or second) sides of the documents. Finally, the scanned documents can be tagged or otherwise identified if desired and in accordance with a desired application of the system and method. The above procedure is merely provided for exemplary purposes and embodiments are intended to cover many variations, such as reversing the order of scanning of the front and back sides of the documents.

Exemplary Embodiments

Figure 1:
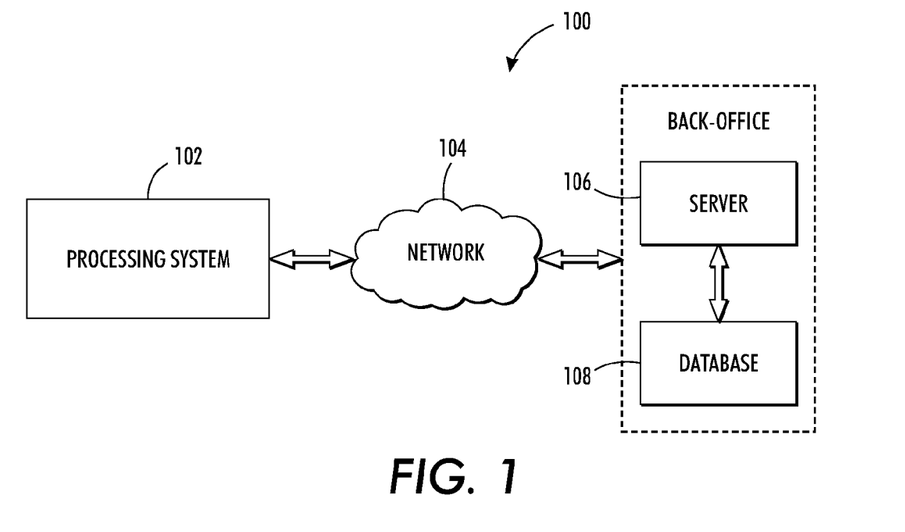
FIG. 1 illustrates an exemplary overall system in which various disclosed embodiments can be practiced.

FIG. 1 illustrates an overall exemplary system 100, in which various embodiments of the disclosed subject matter can be practiced. The system 100 includes a processing system 102, a network 104, a server 106, and a database 108.

Each of the shown components 102, 106, 108 can be configured to communicate with the each other via conventional, related art or later described network protocols. Additionally, the server 106 and database 108 collectively form a part of, or are otherwise located at a back-office. Each of these system components is described in detail in the following sections. In one embodiment, functionalities of the database 108 may be integrated with the server 106 in a single unit. In other embodiments, the database 108 and server 106 are functionally and/or structurally separated in part or in whole.

The processing system 102 can perform all or some of the types of operations generally performed in a business center, such as a bank branch, for example. Those operations can include, but are not limited to, receiving filled-out application forms, scanning the forms, verifying the authenticity of the forms, or the like. Additionally, the processing system 102 can allow the user to perform activities such as filling application forms, verifying forms, uploading or downloading daily reports, requesting stationary, paying bills, viewing account summary, printing statements, printing reports, viewing branch reports, uploading documents, downloading documents, and so on, and may include printing, copying and faxing functionalities. However, in some embodiments, these extraneous functions are not related to the system and methods of the present disclosure.

In the context of the present disclosure, the processing system 102 includes a sleeve (although not specifically shown in FIG. 1, but shown in other figures). The sleeve is configured to receive a number of documents arranged, generally adjacent, or in related locations relative to each other. The sleeve is organized for placement on a platen for scanning. The processing system 102 then starts the scanning process. In particular, the processing system 102 first scans front sides of each document in a single scanning operation, and then scans reverse sides of those documents in a single scanning operation. Thereafter, the processing system 102 generates a scanned output in a pre-defined format. After the scanning activity is complete, the processing system 102 automatically tags each scanned document and sends data related to these documents to the back-office through the network 104 for storage or other purposes.

The network 104 is typically used to connect the processing system 102 to the back-office, such as a central main bank branch. According to an embodiment of the disclosure, the network 104 may be wired or wireless or utilize any other related art or later developed technology. Various examples of such networks include, but are not limited to, Local Area Network (LAN), Wide Area Network (WAN), a Metropolitan Area Network (MAN), Wireless LAN, and so forth. Additionally, the network 104 can be a local, regional, or global communication network, such as an enterprise telecommunication network, the Internet, a global mobile communication network, or any combination of similar systems. For example, the network 104 may be an interconnection between an enterprise network, the internet, and a cellular network. When the network 104 is a combination of an enterprise network (or the Internet), and a cellular network, suitable mechanisms can be employed to seamlessly communicate between the two networks. For instance, a mobile switching gateway may communicate with a computer network gateway to pass data between the two networks. Similarly, if the network 104 includes two or more networks employing differing protocols, suitable interfaces may be introduced to allow communication between these disparate networks.

In the back-office, the server 106 receives the document data (i.e., the scanned tagged documents) from the processing system 102 and stores those tagged documents in the database 108 for later retrieval or use. In other embodiments, the server 106 links the received document data with a profile of the user.

Exemplary Flowchart

Figure 2:
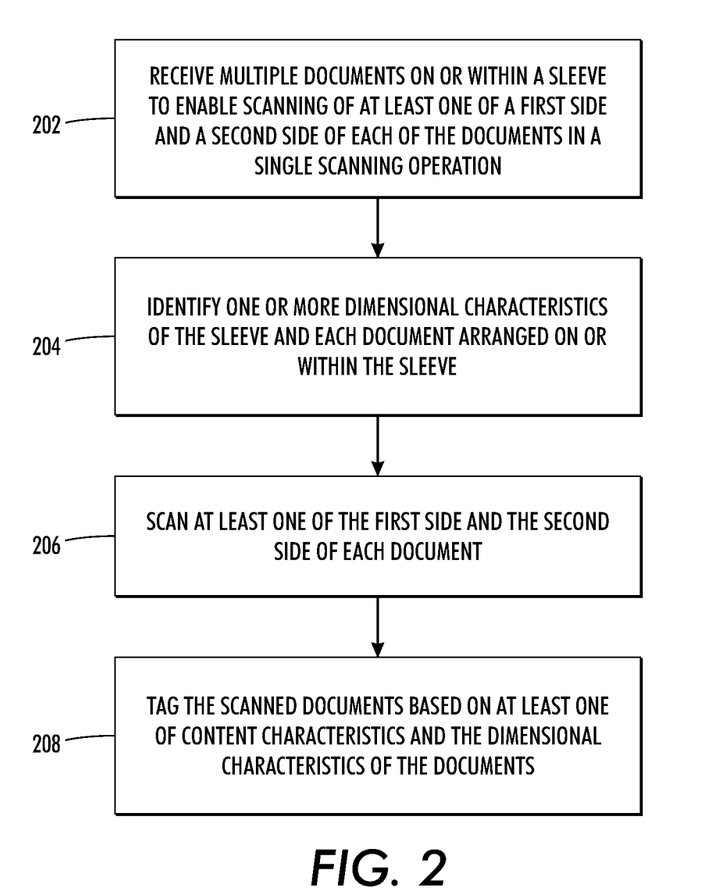
FIG. 2 is a flow chart for method of handling multiple documents while scanning according to an exemplary embodiment.

FIG. 2 is a flowchart for handling documents while scanning, according to one embodiment of the disclosure. Particularly, the method utilizes a processing system, multi-function device or equivalent device for scanning multiple documents and tagging each scanned document.

Each time a user fills-out or otherwise provides information for an application form, e.g., opening a bank account, updating details, applying for a loan, one or more supporting documents, such as a voter ID, ration card, and PAN card, may be required to be submitted. Various account types in the context of opening a bank account may include checking accounts, current accounts, savings accounts, employment records, and so forth. To this end, the user scans those supporting documents along with the application form, and then submits the supporting documents and application form to a bank branch, for example. In the current or related art scenarios, if the user wishes to scan three documents, such as a voter ID, PAN card, and an application form, the user places these documents back and forth on a platen, and thus scanning each document one at a time can be inefficient. This process requires the user to perform a time consuming and an effort intensive activity. In some situations, the user needs to scan both sides of the documents, resulting in the user scanning three documents six times, and thus the procedure of scanning three documents becomes a cumbersome activity. After scanning, these documents are sent to a different place, i.e., back-office, for tagging purposes, where one or more bank employees (or other person) manually enter tags for the documents, type of the document, or other relevant information. In addition, there is no way of automatic tagging these documents at the time of scanning. To address the above challenges, the present disclosure describes a method for scanning multiple documents and then automatically tagging each document for efficient archival/retrieval.

An exemplary method is described below for illustrative purposes only, but is not intended to limit the scope of the present disclosure. For a person skilled in the art, it must be clear that the steps as outlined in the method and performed by the various embodiment can be performed in any order to achieve the desired objective.

At Processing System

A user may initially fill out or otherwise provide information for an application form, and may be requested to submit one or more supporting documents. To this end, documents that are to be scanned, are arranged in a sleeve by the user. These documents can be disposed on or within the sleeve. For example, if the user wishes to scan only a PAN card and a driver's license, then the user places these two documents inside the sleeve. However, if the user wishes to scan an application form along with the PAN card and driver's license, then the user arranges these three documents in the sleeve. These documents that are arranged on or within the sleeve (ultimately for scanning) can be of the same size or of different sizes. Once all of the documents are arranged on or within the sleeve, in some embodiments, the user presses over the sleeve to enable or even ensure that the documents are "sandwiched" between upper and lower portions of the sleeve (which will be more fully disclosed in conjunction with FIG. 4). However, other embodiments include or otherwise cover any other method or operation for disposing the documents between the sleeve's upper and lower portions. In some of these methods or operations, the documents are rigidly held in place, while other embodiments retain the documents less rigidly. In fact, embodiments are intended to cover any method or apparatus that enables the sleeve to retain the documents for scanning and/or performing other relevant operations.

At step 202, the sleeve containing multiple documents is received on a platen. Each document has at least a first side and a second side. The sleeve enables scanning of at least one of the first side and the second side of the documents in a single scanning operation. The first side can be a front side of the document that generally includes user details, such as name, photograph, or other details. The second side is then a back side of the document that typically includes disclaimers, other additional information, or may be blank. For example, the PAN card typically includes name, date of birth, and a photo on the front side, and on the back side, the PAN card typically includes a disclaimer. Thereafter, the scan operation is initiated. In one example, the scanning process is initiated by the user, such as by pressing a scan button, for example, but in other aspects, scanning starts automatically.

At step 204, one or more dimensional characteristics of the sleeve and the documents arranged on or within the sleeve, are identified by the processing system 102. The dimensional characteristics include, but are not limited to, original size/shape of the documents, boundary of the documents, position of the documents placed inside the sleeve, and orientation of the documents. In one example, identifying the boundary and/or perimeter of a document allows the processing system 102 to determine the size and/or position of that document. Similarly, dimensional characteristics of the sleeve, e.g., size and/or position, are determined. Position and orientation of the documents help differentiate and to allow software and/or hardware to combine or otherwise associate the documents' front and back sides with each other. In addition to the dimensional characteristics, a mirror image of each document can be captured.

The dimensional characteristics can be determined by known, related art or later developed algorithms. In one exemplary embodiment, the boundary and/or perimeter around the documents can be identified by analysis of signals produced by a light sensor (not shown). Light projected from a light source (not shown), and not blocked by any of the documents so as to travel directly from the light source through the substantially light-transmissive sleeve/platen to the light sensor enables the detection of blank spaces between different documents. However, if the light is blocked by the documents placed on the sleeve, then the signal may be interpreted as an area where documents have been placed. This process produces electrical signals representative of the spaces between the documents as well as the boundaries or edges of the documents. The boundaries around the documents may be determined by analysis of the signals produced by the light sensor. Of course, detailed image analysis can be applied to scanned data to determine the boundaries of the documents as well. Identifying the boundaries of the documents helps determine the sizes and positions of those documents.

At step 206, the first side and the second side of each document are scanned. For example, the first side of each of the documents can be scanned first and then the user can reverse the sleeve and place the sleeve back on the platen so that the second side can be scanned. Then, the second side of each of the documents is scanned. While scanning, or after scanning the documents, content, including text data and/or image data from both sides of the documents can be extracted using various known, related art or later developed algorithms. One such non-limiting example is Optical Character Recognition (OCR).

If any side of the document is completely blank, then processing system 102 may skip scanning that side. Alternatively, in other embodiments, the processing system 102 can be configured to scan the blank side of the document.

Thereafter, the second side of each document is matched to its corresponding first side, based on the dimensional characteristics of the document as identified above. In one aspect, matching includes comparing the second side of each document to its corresponding mirror image to confirm an association with the first side of that document. Once matched, for each document, the second side is combined or otherwise associated with its corresponding first side. In certain scenarios, where the second side of any document is blank, then the second side may not be combined or otherwise matched up with its corresponding first side. In alternative scenarios, even if the second side is blank, the second side is combined or otherwise match-up with the corresponding first side for record purposes.

Finally, a scanned output is generated in a pre-defined format. The scanned output may be an image in a variety of formats, such as JPG, BMP, PDF, etc. In one embodiment, the output is returned based on the number of documents input for scanning.

Embodiments are intended to cover any known, related art or later developed methods or apparatus for performing the scanning or otherwise creating images of the documents, for example, in one embodiment, the images of the input documents are created by reflecting the document content along various paths below the platen/scanning surface. That hardware and/or software (and general methodology) are not further described or illustrated here for the purpose of clarity.

Figure 4A:
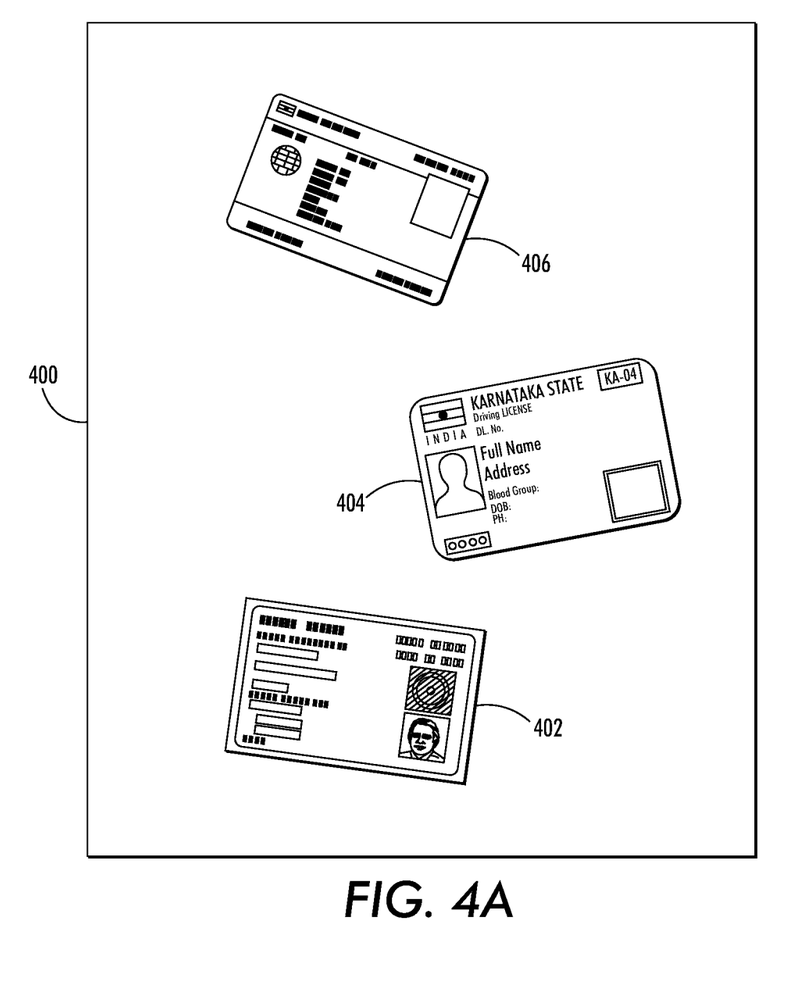
FIG. 4A illustrates another exemplary sleeve including multiple documents.
Figure 4B:
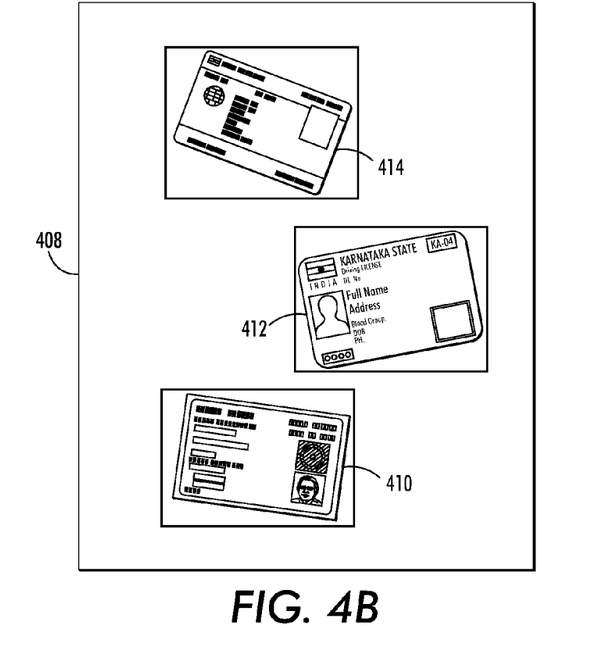
FIG. 4B illustrates a scanned output of the documents shown in FIG. 4A as a single image.
Figure 4C:
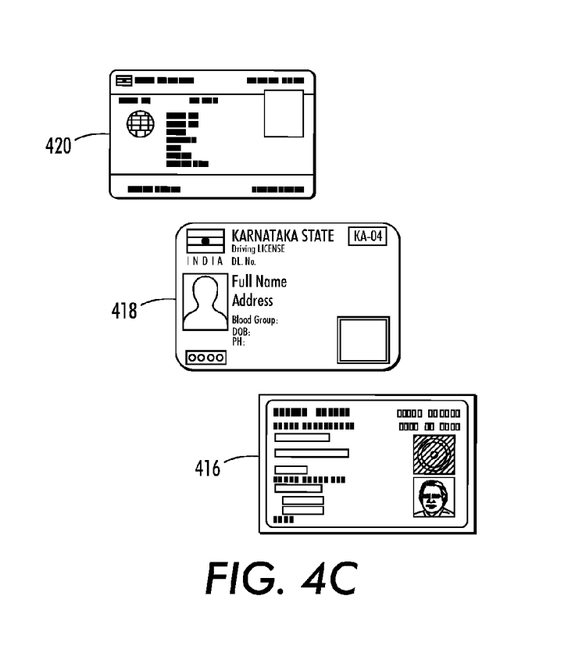
FIG. 4C illustrates a scanned output of the documents shown in FIG. 4A as separate images.

In one example, shown in FIG. 4A, the user arranges three documents 402, 404, 406 in a sleeve 400. Accordingly, in one embodiment as shown in FIG. 4B, the scanned output can be a single image 408 including three scanned images 410, 412, 414, each image corresponding to input documents 402, 404, 406, respectively. In other embodiments, as shown in FIG. 4C, the scanned output can be three different images 416, 418, 420, each corresponding to input documents 402, 404, 406, respectively. These images can be segmented using a variety of known, related art or later developed algorithms such as thresholding, edge detection, connected component labeling, etc.

Figure 6A:
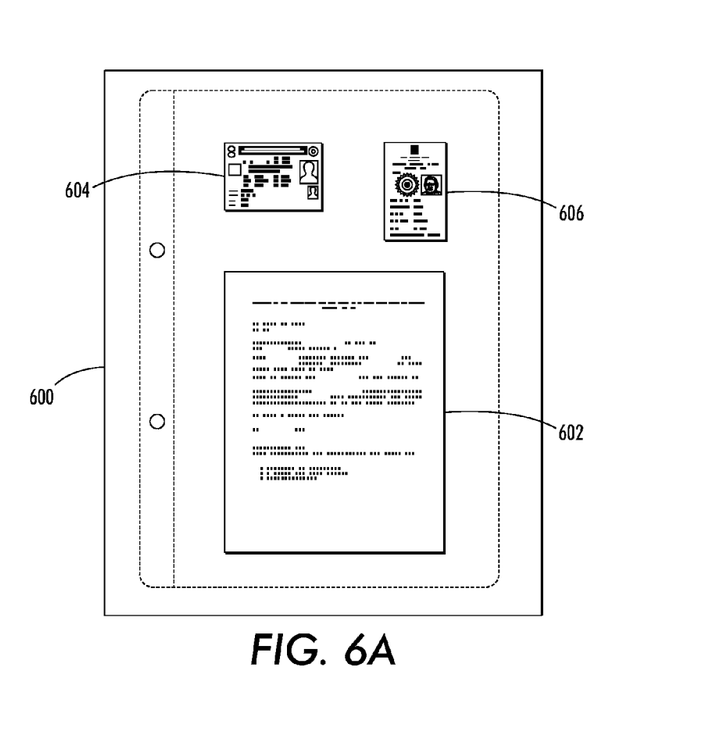
FIG. 6A is an illustrative representation of the sleeve of FIG. 3A on a user interface.
Figure 6B:
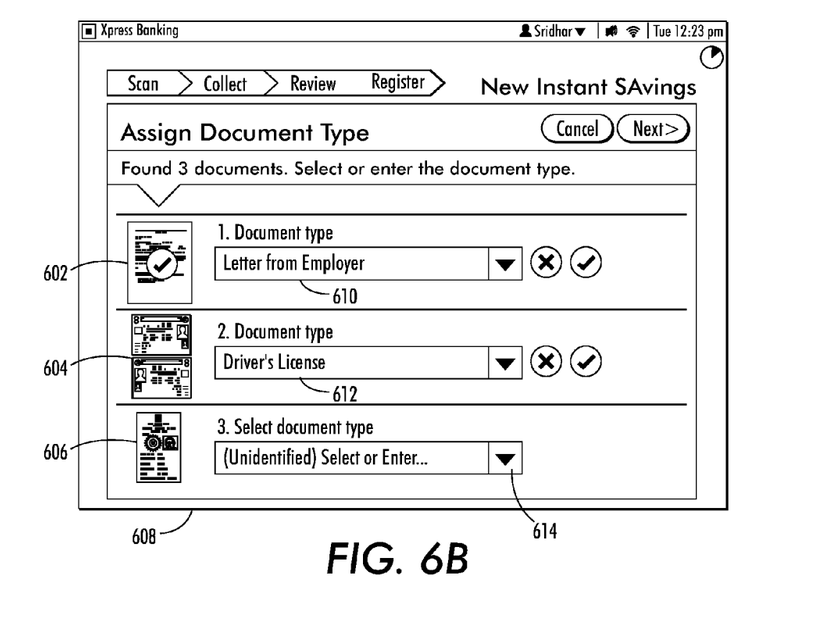
FIG. 6B is a screenshot displaying tags corresponding to the scanned documents.

After all the documents are scanned, at step 208, each scanned document is tagged based on the content characteristics and/or dimensional characteristics of the documents. For example, if a scanned document is below A3 or A4 size, and includes the keywords "Driver license" (or other combination of similar words possibly stored in a lookup table), the tag for that document can be "Driver's License." All of the scanned documents can be tagged in a similar manner, however, other embodiments can utilize multiple different tagging methods. In some instances, the tagged content (or tag) is displayed to the user for validation purposes, such as through a user interface 608 as shown in FIG. 6B. According to one example, the tags for two documents inputted for scanning are Letter From Employer marked as 610 and Driver's License as 612. If desired, the user can edit the tagged content as required. In certain cases, where the processing system 102 is not able to identify a tag for a document for some reason, the user can input a tag for that document. The tag can be inputted in a text box or can be selected from a drop-down menu 614 by the user, for example.

In one embodiment, the scanned tagged documents are sent to the back-office, and in particular routed to a database. The tagged documents can be compressed using various known compression algorithms to facilitate the sending or electronic transmission of documents. In other embodiments, the scanned tagged documents can be linked with a profile of the user. In additional embodiments, the scanned tagged documents can be sent to one or more computing devices, such as smart phones, tablets, Personal Digital Assistant (PDA). The documents can be sent via email, Short Messaging Service (SMS), Multimedia Messaging Service (MMS) or other communications methodologies. The tag can also be included in the subject of the email and/or file name if the scanned documents are sent to an email address. For example, if a tag for a document is "PAN CARD," accordingly, the name of the image file can be "PAN CARD". In yet other embodiments, the scanned documents can be printed out.

Additionally, the method includes classifying the tagged documents into a category, based on the type of the documents, dimensional characteristics, and/or content of the documents. Various examples of the pre-defined categories are, but are not limited to, proof of identity, proof of address or the like. One of skill in the art will understand that new categories may be contemplated for classifying different documents for different applications of the disclosed subject matter.

At Back-Office

Back-offices may even typically include servers, databases, and systems for processing the application forms and supporting documents. Examples of different back-end offices may include a central record-keeping office, processing centers for executing transactions, a third party validation system, or the like.

As mentioned above, the scanned or tagged documents are received by the server, and thereafter saved in a database. In the case of compressed documents, the documents are decompressed first using the same algorithms used for compression by the processing system 102, and then saved in the database. As a next step, the back-office considers the tagged documents for any future retrieval as desired. For example, if the user needs to search for a document, then the user can input search terms such as voter ID or customer ID, and accordingly, the associated documents are retrieved.

In one embodiment, the user can be a customer of a banking organization, where the customer is requested to submit multiple supporting documents to a bank branch, for example. To this end, the customer uses the disclosed methods and systems for scanning the multiple documents and submits the documents as required.

In other embodiments, the user can be a bank employee, such as a bank branch manager, for example.

Embodiments can be utilized by a banking organization in various scenarios, such as where bank staff collects forms and supporting documents from various customers and scans the collected documents, e.g., forms and/or supporting documents at the end of the working day. Here, the bank staff can utilize the disclosed methods and systems for scanning the collected documents and then saving the scanned documents in databases. In one example, the bank staff may scan proofs of ID collected from various customers. Other commercial. non-profit, educational, and governmental entities can utilize the disclosed methods systems and devices in a manner appropriate to particular applications related to the specific entity.

Exemplary Sleeve

Figure 3A:
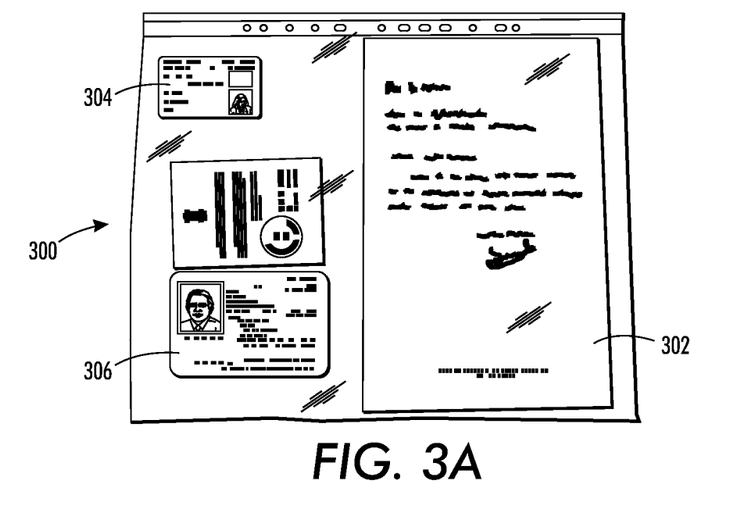
FIG. 3A illustrates an exemplary sleeve including multiple documents and FIG. 3B illustrates a reverse side of the exemplary sleeve of FIG. 3A.

FIG. 3A shows an exemplary sleeve 300 with three documents disposed inside the sleeve. A person of ordinary skill in the art will understand that there can be any number of the documents that can be arranged within the sleeve 300. As shown, the documents inside the sleeve include a PAN card 304, driver's license 306 and a letter from an employer 302.

Figure 3B:
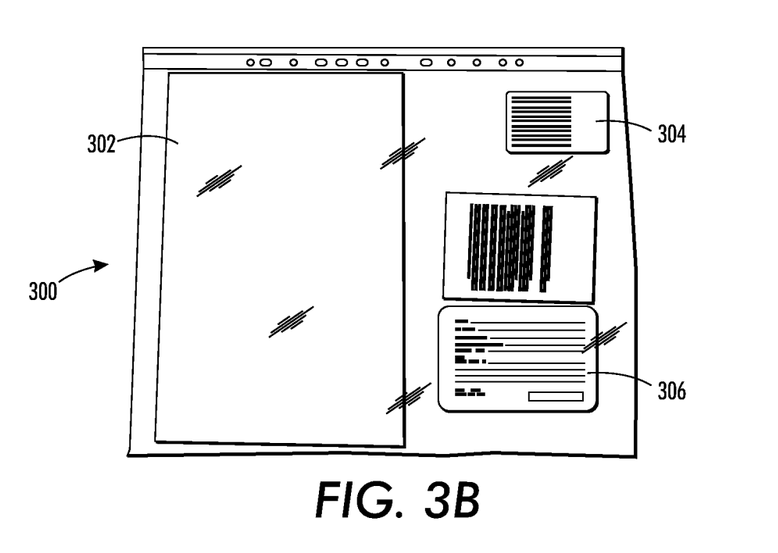

The documents are arranged in the sleeve 300 shown in FIG. 3A, such that the front surfaces of the documents face upward or in an orientation enabling the front surfaces to be scanned. FIG. 3B shows a reverse side of the sleeve 300 placed on the platen. When the sleeve 300 is reversed, a back side of the documents 302, 304, and 306 gets scanned.

The sleeve 300 can be substantially (i.e., almost totally or totally) light-transmissive such that the documents can be easily viewed and scanned through the sleeve 300. In addition, the sleeve 300 can include an identifier (although not shown), such as indicia, markings, embedded chip(s), embedded RF device(s), particular sizing or shape, or other identifying characteristic that can be read by the scanner or other portion of the multi function device or system such that the system can either store the data that is scanned by the system in a particular manner or request particular actions be taken with the documents and/or scanned data for specific applications. Furthermore, the sleeve 300 shown in FIGS. 3A and 3B is provided merely for illustrative purposes and is not intended to be limiting. For example, embodiments are intended to cover any sleeve 300 structure that addresses some or all of the functions shown above. In some embodiments, the sleeve 300 defines a single contiguous space such that documents disposed therein can be arranged in any orientation and/or location. In other embodiments, the sleeve 300 is divided among two or more separate compartments to provide various advantages, such as to enhance separation of the documents. In some of these embodiments, the separate compartments can be provided with predetermined dimensions, such as to correspond to sizes of the specified documents.

Embodiments are intended to cover all structures of the sleeve 300 that facilitate scanning of at least one side of multiple documents in a single operation, for example, the sleeve 300 of some embodiments can include either an adhesive (chemical or electrical or magnetic) or a physical structure to hold the documents in place and to reduce or prevent movement of the documents during scanning. In some such embodiments, some or all of the interior surfaces of the sleeve 300 stick to the documents to temporarily hold the documents in place.

In still other embodiments, the sleeve 300 does not retain the documents within an interior. For example, the sleeve 300 can have a structure such that the sleeve 300 does not define an interior, and the documents are instead retained on an exterior surface. In one such embodiment, the exterior surface of the sleeve 300 is sticky such that one surface of each of the documents sticks thereto. The sleeve 300 can also include tabs, slots, slits, buttons, magnets, pockets or other structural features that would retain or receive a document for placement and/or retention on the sheet.

In view of foregoing, it should be understood that the sleeve 300 may be any structure capable of holding, retaining and/or receiving at least one or more documents. For example, the sleeve 300 may be a single sheet capable of adhering to a document or could be multiple sheets. Furthermore, the sleeve 300 could include structure that allows documents to be received and/or retained thereon. For example, the structure can include tabs, magnets and/or a mesh built into the sleeve 300 for retaining the documents.

Other embodiments of the sleeve 300 can include but are not limited to a sleeve 300 that consists (or comprises) a mesh material into which corners of the documents can be placed to secure the documents thereto. In addition, the sleeve 300 can be made from an opaque material if only single sided scanning is desired. Use of an opaque material can reduce the cost for the sleeve 300, and can include a sleeve made from any textile, plastic, paper, fabric, mesh, sticky, or other known sheet like material that is flexible and can include adhesive materials or structures for retaining documents thereon. In some embodiments, the sleeve 300 may include sticky substantially light-transmissive pockets to maintain supporting documents in place while flipping.

Exemplary System

Figure 5:
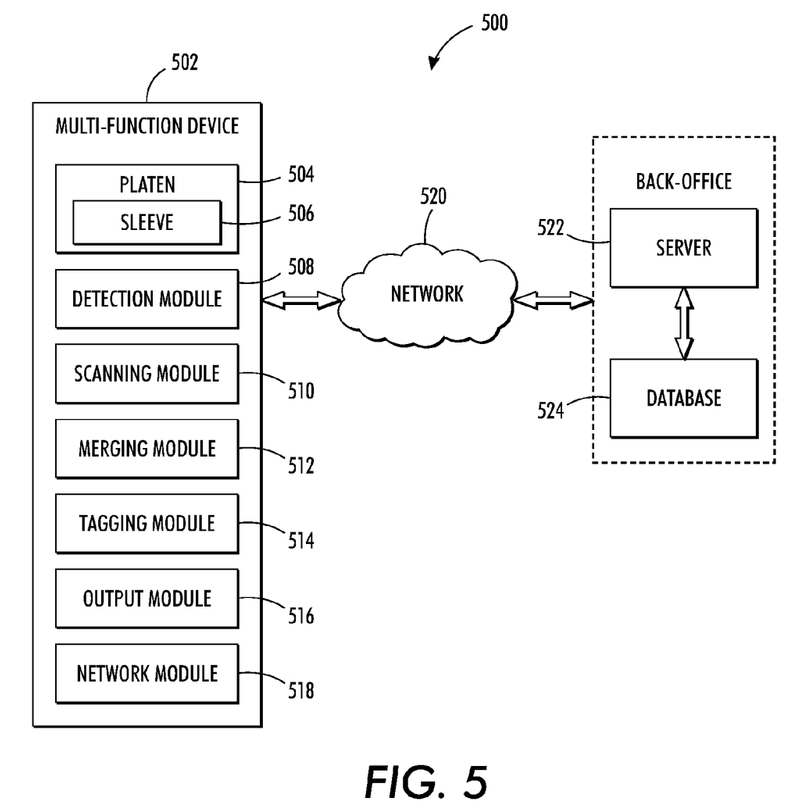
FIG. 5 is a block diagram illustrating interaction among various components for handling multiple documents while scanning, according to an exemplary embodiment.

FIG. 5 is a block diagram illustrating interaction among various components for processing documents while scanning, according to one embodiment of the disclosure. FIG. 5 shows a system 500, including a Multi-function device (MFD) 502 and a back-office. The MFD 502 includes a platen 504, a sleeve 506, a detection module 508, a scanning module 510, a merging module 512, a tagging module 514, an output module 516, and a network module 518.

The platen 504 supports the documents when image of the documents is being scanned. Typically, the platen 504 is a glass plate on which the user places the document for scanning. In the context of the present disclosure, the platen 504 is configured to receive the sleeve 506 having multiple documents for scanning. The width of the platen 504 is sufficiently larger than the maximum width of the sleeve 506.

As shown, the sleeve 506 is a component adapted to receive multiple documents for scanning. The documents can be arranged on or within the sleeve 506 in any desired fashion. Various types of documents are, but not limited to, application forms, supporting documents, checks, or the like. The documents can be of mixed sizes, with different length and width. Each document includes text and/or images. Each document can be separated by a pre-determined amount of horizontal and vertical space.

The sleeve 506 includes two portions, an upper portion, and a lower portion, between which the documents are arranged. These portions are temporarily stuck to each other. The sleeve 506 is self-adhesive such that the documents are quickly positioned. For example, the sleeve 506 can include a tacky adhesive layer that allows for quick and easy placement of the documents relative to each other. Alternatively, the upper portion and lower portion can adhere to each other by magnetic forces associated with the static electrical status of the upper and lower portions to sandwich the documents in place therebetween. Further, the sleeve 506 is completely transparent for capturing mirror image of each document. In one embodiment, the sleeve 506 is of plastic material.

The sleeve 506 is sufficiently sized to receive multiple documents. For example, the sleeve 506 can be of A3 or A4 size. In one embodiment, the sleeve 506 is equivalent or smaller than the platen size. There can be various other sizes of sleeves that can be supported based on the platen size and the application requirements. Additionally, the sleeve 506 is temporarily placed on the platen 504 when scanning of multiple documents is required. Once the scanning activity is completed, the sleeve 506 can be removed from the platen 504.

Once the sleeve 506 with multiple documents is placed on the platen 504, a processing module (although not shown) generates a ready signal.

In one embodiment, the sleeve 506 can be configured as an external scan surface (not platen), temporarily attached to the platen 504. In other embodiments, the sleeve 506 can be configured as a virtual scan surface created by the multi-function device 502. On that scan surface, multiple documents for scanning can be placed. Additionally, the sleeve 506 can be configured as any component that helps in scanning multiple documents and further helps optimizing the platen 504 capability.

The detection module 508 is configured to detect dimensional characteristics of the sleeve 506 and the documents within the sleeve. The dimensional characteristics include size (lengths and widths), position, boundary, orientation or the like. For example, the detection module 508 is configured to detect the size of each document and position of each document disposed on or within the sleeve. When reversing the sleeve either back upright or back upside down, the detection module 508 detects the reverse side of the sleeve 506.

Based on the dimensional characteristics, the detection module 508 detects the number of documents arranged on or within the sleeve 506 and identifies the front side and back side of each document.

In general, the scanning module 510 scans one or more documents and generates the scanned document data (referred to as scanned output) in the form of a PDF file or an image file. These formats can be pre-defined according to a user's preferences or can be default settings. After this, the scanned image is saved in a memory (not shown). In the context of the present disclosure, the scanning module 510 is configured to scan the documents arranged inside the sleeve, in particular, the scanning module 510 is configured to scan both sides of the documents, the front side and the back side in a single scanning operation. If the back side of any document is blank, the scanning module 510 may be configured to skip the scanning of that page or portion.

Along with scanning, the scanning module 510 may be capable of performing traditional functionalities, such as printing, copying, faxing, and/or other known imaging functions. In addition to this, the scanning module 510 can be further utilized for enhancing the quality of scanned information by skewing the information appropriately, varying the contrast, or color attribute, removing the noise, removing the background, detecting blank page, alignment, and so forth. The scanning module 510 may include other functions that are not relevant for purposes of the present disclosure and will not be described in further detail here. It will be understood that the scanning module 510 may perform one, few, or all of the mentioned operations without departing from the scope of the disclosure.

As shown, the multi-function device 502 herein represents a single unit performing one or more functionalities as described above. However, the multi-function device 502 can be replaced with one or more units each performing one or more of the functionalities of printing, scanning, copying, and faxing. In other embodiments, the multi-function device 502 can be replaced with a printer, a scanner, and a copier.

The merging module 512 can be configured to merge the front side of a document to its corresponding back side. Before merging, the merging module 512 does a comparison check to identify a mirror image of the document. Once identified, the front side is combined or otherwise associated with its back side. In an embodiment, the front side and the back side can be merged based on the size of the documents, content of the document, or the like.

The tagging module 514 is configured to tag each document based on at least one of: dimensional characteristics, e.g., size, and/or content of the document. In some embodiments, the user can provide inputs for tagging the documents. Further, the tagging module 514 further includes an extraction module and a classification module. Additionally, the documents can be tagged by date and time. In an embodiment, one document can have multiple tags, such as a customer ID and/or voter ID.

The extraction module extracts the content, including, for example, the image and/or text from each document. For extraction, one or more algorithms, such as algorithms for Optical Character Recognition (OCR) can be used. The classification module is configured to classify the documents in a pre-defined category. The category can be defined based on the type of the documents. For example, one category can be proof of ID that includes documents such as PAN card or any other identity card. A number of known training tools or probabilistic models can be used for classification.

An output module 516 is configured to generate a scanned output in a pre-defined format as discussed above. In one embodiment, the output can be a single scanned copy containing three images, each corresponding to a document disposed on or within the sleeve for scanning. In other embodiments, the output can be three different scanned copies, each copy corresponds to a document input for scanning. The output generated corresponding to each document can be of same size or varying size.

Network module 518 is configured to send the tagged documents to a back office over a network 520. In other embodiments, the network module 518 is configured to send the tagged documents to the various computing devices as discussed above.

Moreover, the multi-function device 502 includes a user interface (although not shown). The user interface is configured to display an image of the sleeve 506 with multiple documents. One such representation of sleeve 600 on the user interface is shown in FIG. 6A. As shown, the sleeve 600 includes documents 602, 604, and 606. Further, the user interface is configured to display instructions or other relevant information to the user. In one example, the instructions can be in the form of a human readable format. For example, the instructions can be: "turn the sleeve." Such instructions can be displayed when front sides of each document are scanned. In one embodiment, the user interface is configured for receiving an input and displaying an output in the desired format. For example, the user can provide input by pressing a scan button to initiate the scanning process. The output includes displaying the tag for each document being scanned. The user interface allows the user to review the tags and confirm if correct and edit the tag if necessary.

In one embodiment, the user interface displays one or more instructions on the display, or relays them over the audio system. Some instructions may require user inputs as well. In such instances, the user interface may impart interactive capabilities to the display device, allowing users to provide information through a keypad, a touchpad, or simple operation buttons on the portable banking system. Further, the user interface of the system is interactive and elaborative enough so that the user can easily perform the desired activity. The user interface may be part of the multi-function device 502 or can be external to the MFD.

The MFD 502 includes an internal storage module (not shown) configured to store the scanned/tagged documents. Additionally, the MFD 502 can include an input interface configured to receive an input from the user. In one aspect of the disclosure, the input may be provided using input devices such as a keyboard, mouse, display, user interface, touch pad, and the like.

In the back office, server 522 receives the tagged document from the MFD 502, and saves the received tagged documents in the database 524. In some embodiments, the server 522 links the tagged documents with a profile of the user.

A person of ordinary skill in the art would understand that various components/modules as mentioned above may be in the form of hardware or software modules. Additionally, the components/modules of the system are connected internally via a communication bus that is known in the art and need not be described herein. The aforesaid components perform their respective functions and further interact with each other, thereby, enabling the system to function appropriately.

Figure 7A:
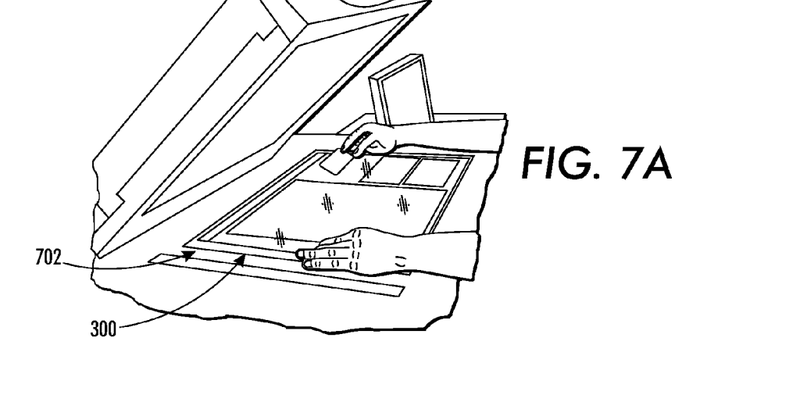
FIGS. 7A-7C illustrate the sleeve of FIG. 3A arranged on a platen.
Figure 7B:
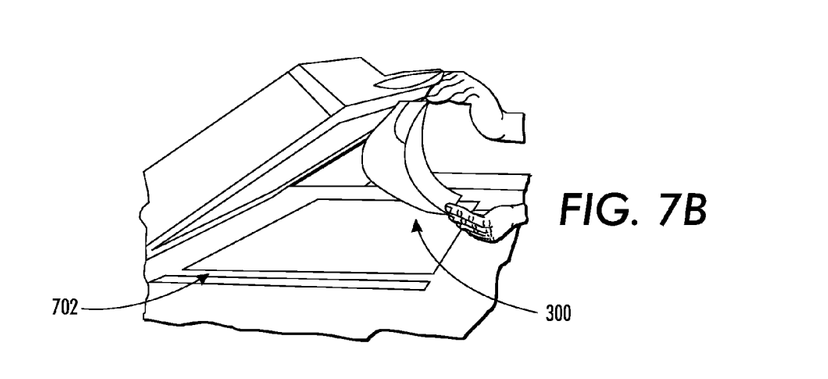
Figure 7C:
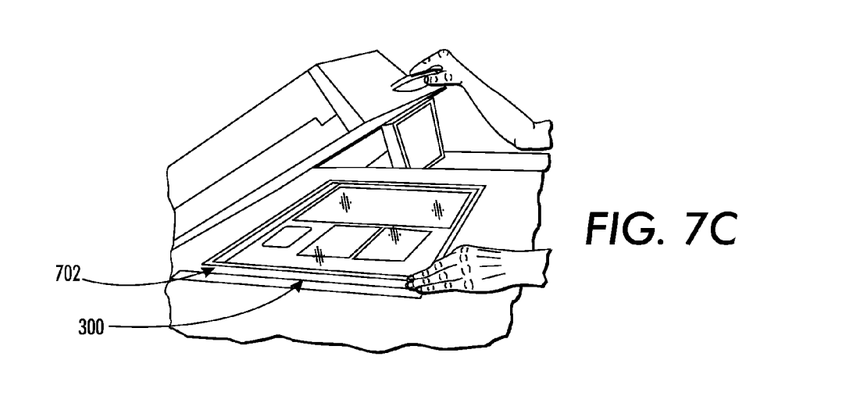

FIGS. 7A-7C are snapshots showing sleeve 300 of FIG. 3A being arranged on a platen 702. As shown in FIG. 7A, the sleeve 300 is arranged on the platen 702 such that front sides of documents are scanned. Once the front sides are scanned, the sleeve 300 is reversed by the user as shown in FIG. 7B. FIG. 7C shows an embodiment when the reverse side of sleeve is placed on the platen 702 for scanning back sides of the documents.

For simplicity, the disclosure above has described the applicability of the disclosed embodiments to the field of banking. However, a person skilled in the art would understand that the disclosed embodiments can be applied to a variety of fields, where a user may be required to fill out an application forms or other forms, or that simply requires scanning of any document. Such fields can include, but are not limited to, claims processing (medical, travel, or others), insurance, telecom, postal services, expense report filing, or other similar fields.

The present disclosure discloses methods and systems for handling documents while scanning. The disclosure facilitates a way to accelerate the scanning of multiple documents, thus, saving significant effort, time and energy of a user. Further, the disclosure describes automatic tagging multiple documents, thereby, allowing efficient retrieval of the documents at any time. Moreover, the disclosure provides a sleeve that helps in optimizing the platen capability. Additionally, the disclosures facilitates tagging of documents at the time of scanning, thereby eliminating the need of sending the documents to a different place for tagging. The disclosure also focuses on reducing document damage through the above process.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for use with a device for handling multiple documents, the method comprising:
   arranging the multiple documents within a sleeve consisting of a single sheet;
   receiving, using the sleeve, the multiple documents, each of the multiple documents comprising a first side and a second side;
   identifying, using the device, one or more dimensional characteristics of the sleeve and each of the multiple documents;
   scanning, using the device, at least one of the first side and the second side of each of the multiple documents to create at least one image for each of the multiple documents; and
   associating, using the device, a user-editable tag with the at least one image while the corresponding multiple documents are being scanned, wherein the user-editable tag is associated based on the identified one or more dimensional characteristics of the corresponding multiple document.

2. The method of claim 1, wherein the device is an imaging device.

3. The method of claim 1, wherein the dimensional characteristics include at least one of shape, boundary, size, orientation, and position.

4. The method of claim 1, wherein the step of identifying further comprises:
- identifying a number of the multiple documents being received by the sleeve, and
- determining a reverse side of the sleeve based on one or more identifiers associated with the sleeve.

5. The method of claim 1 further comprising, for each of the multiple documents after the scanning step, associating a scanned first side to a corresponding scanned second side based on the one or more dimensional characteristics of the documents.

6. The system of claim 5, wherein only one of the first portion or the second portion is opaque.

7. The method of claim 1, further comprising capturing a mirror image of each of the multiple documents while performing the scanning step.

8. The method of claim 1, wherein the step of scanning further comprises:
- extracting, using an extraction module, content including at least one of text data and image data from the at least one image; and
- determining, using the extraction module, a type of each of the multiple documents based on at least one of the extracted content and one or more dimensional characteristics of each of the multiple documents.

9. The method of claim 1 further comprising:
generating a scanned output in a pre-defined format.

10. The method of claim 9, wherein the generating the scanned output includes generating a single scanned file comprising multiple images, each image corresponding to one of the multiple documents being scanned.

11. The method of claim 9, wherein the generating the scanned output includes generating multiple files, each of the multiple files corresponding to one of the multiple documents being scanned.

12. The method of claim 1, further comprising:
labeling each of the scanned documents based on a corresponding tagged content.

13. The method of claim 1, further comprising:
linking, using a processing module, the tagged documents with a profile of a user.

14. The method of claim 1, further comprising:
sending the tagged documents to one or more computing devices.

15. The method of claim 1, further comprising:
classifying the tagged documents in at least one pre-defined category.

16. The method of claim 1, wherein the arranging step comprises arranging at least two documents among the multiple documents that are of a different size.

17. The method of claim 1, wherein each of the multiple documents are of a same size.

18. A system for processing a plurality of documents, the system comprising:
- a sleeve consisting a single sheet configured to receive the plurality of documents, each having a first side and a second side; and
- an imaging device including a processing module configured to:
  - determine one or more dimensional characteristics of the sleeve and the plurality of documents;
  - scan at least one of the first side and the second side of each of the plurality of documents simultaneously through the sleeve;
  - determine at least one of content, content type, and dimensional characteristics of the plurality of scanned documents;
  - generate at least one image corresponding to at least one of the first side and the second side for each of the plurality of scanned documents; and
  - associate a user-editable tag with the generated at least one image while the plurality of documents is being scanned, wherein the user-editable tag is associated based on at least one of the content, the content type and the dimensional characteristics of the first side and the second side of a corresponding scanned document among the plurality of scanned documents.

19. The system of claim 18 further comprising an output module configured to generate the plurality of scanned documents in a pre-defined format.

20. The system of claim 18 further comprising a user interface configured to display at least one of the scanned documents and information related to the at least one tagged image.

21. The system of claim 18 further comprising an extraction module configured to extract the content and to determine a corresponding content type from each of the plurality of scanned documents.

22. The system of claim 18 further comprising a classification module configured to classify the at least one image into a pre-defined category based on the user-editable tag.

23. The system of claim 18, wherein the sleeve includes a first portion, a second portion, and a predetermined space therebetween, wherein the plurality of documents is secured within the predetermined space.

24. The system of claim 18, wherein the sleeve includes an adhesive material configured to removably secure placement of each of the plurality of documents received by the sleeve.

25. The system of claim 18, wherein the sleeve includes an identifier configured for being used by the processing module to determine if the sleeve is reversed.

26. A computer-implemented method for scanning a plurality of documents, the method comprising:
- detecting, using a detecting module, each of the plurality of documents having a first side and a second side, wherein the plurality of documents is received by a single-sheet sleeve;
- determining, using the detecting module, at least one dimensional characteristic of each of the plurality of documents;
- scanning, using a scanning module, the first side and the second side of at least one document among the plurality of documents to generate a first image and a second image respectively, wherein at least one of the first side and the second side is being scanned through the sleeve;
- determining, using a merging module, at least one dimensional characteristic of a mirror image of the first image of the at least one document;
- associating, using the merging module, the second image with the first image based on the at least one dimensional characteristic of the mirror image linking, using a tagging module, a user-editable tag with the associated pair of the first image and the second image while the at least one document is being scanned, wherein the user-editable tag is associated based on the at least one dimensional characteristic of the at least one document.

27. The method of claim 26, wherein the step of scanning further comprises:
- extracting, using an extraction module, content including at least one of text data and image data from at least one of the first image and the second image; and
- determining, using the extraction module, a type of each of the plurality of documents based on at least one of the extracted content and one or more dimensional characteristics of each of the plurality of documents.

28. A computer-implemented method for tagging a plurality of documents, the method comprising:

receiving, using a processing module, the plurality of documents that are received by a sleeve, wherein the sleeve consists of a single sheet configured to receive the plurality of documents;

identifying, using a detecting module, at least one dimensional characteristic of each of the plurality of documents;

scanning, using a scanning module, the plurality of documents simultaneously through the sleeve to generate at least one image corresponding to each of the plurality of documents;

extracting, using an extraction module, content including at least one of text data and image data from the at least one image;

automatically tagging, using a tagging module, the at least one image with a user-editable tag based on at least one of the extracted content and the at least one dimensional characteristic of a corresponding document among the plurality of documents while being scanned; and classifying, using a classification module, the at least one tagged image into a predetermined category based on the user-editable tag.

29. A device for scanning a plurality of documents, the device comprising:

a sleeve consisting of a single sheet configured to receive the plurality of documents, each document having a first side and a second side;

a platen configured to receive the sleeve; and a processing modules configured to:

determine at least one dimensional characteristic of the sleeve;

scan at least one of the first side and the second side of each of the plurality of documents through the platen based on the at least one dimensional characteristic of the sleeve;

extract content including at least one of text data and image data from each of the plurality of documents;

generate a scanned image in a pre-defined format for each of the plurality of scanned documents; and tag the scanned image with a user-editable tag based on at least one of the extracted content and the at least one determined dimensional characteristic of the corresponding document among the plurality of documents.

* * * * *